Oct. 8, 1946.  H. J. DE N. McCOLLUM  2,408,867
MEANS FOR UTILIZING RADIANT HEAT IN AIRCRAFT
Filed July 22, 1942  2 Sheets-Sheet 1
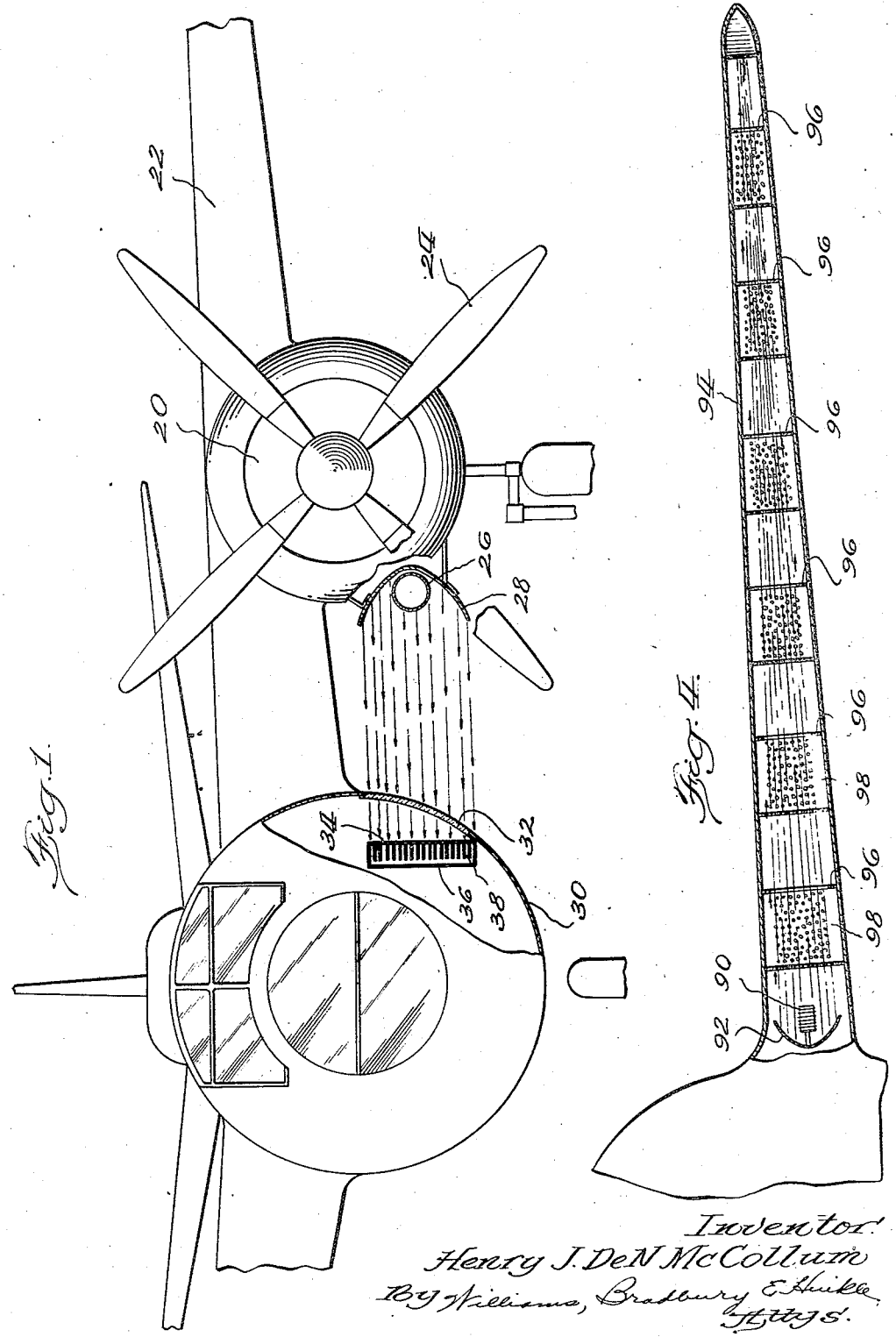
Inventor:
Henry J. DeN McCollum
By Williams, Bradbury & Hinkle
Attys.

Oct. 8, 1946. H. J. DE N. McCOLLUM 2,408,867
MEANS FOR UTILIZING RADIANT HEAT IN AIRCRAFT
Filed July 22, 1942 2 Sheets-Sheet 2
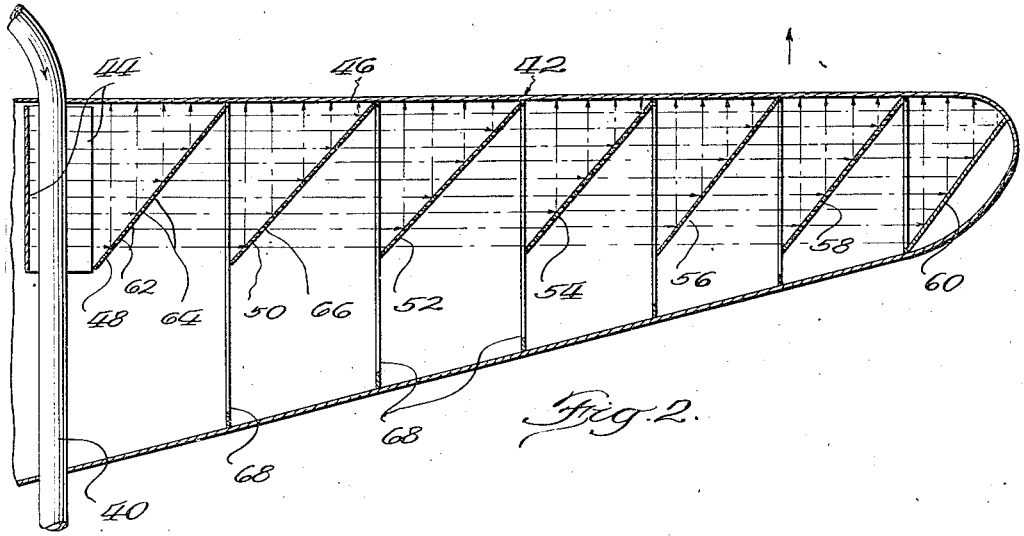
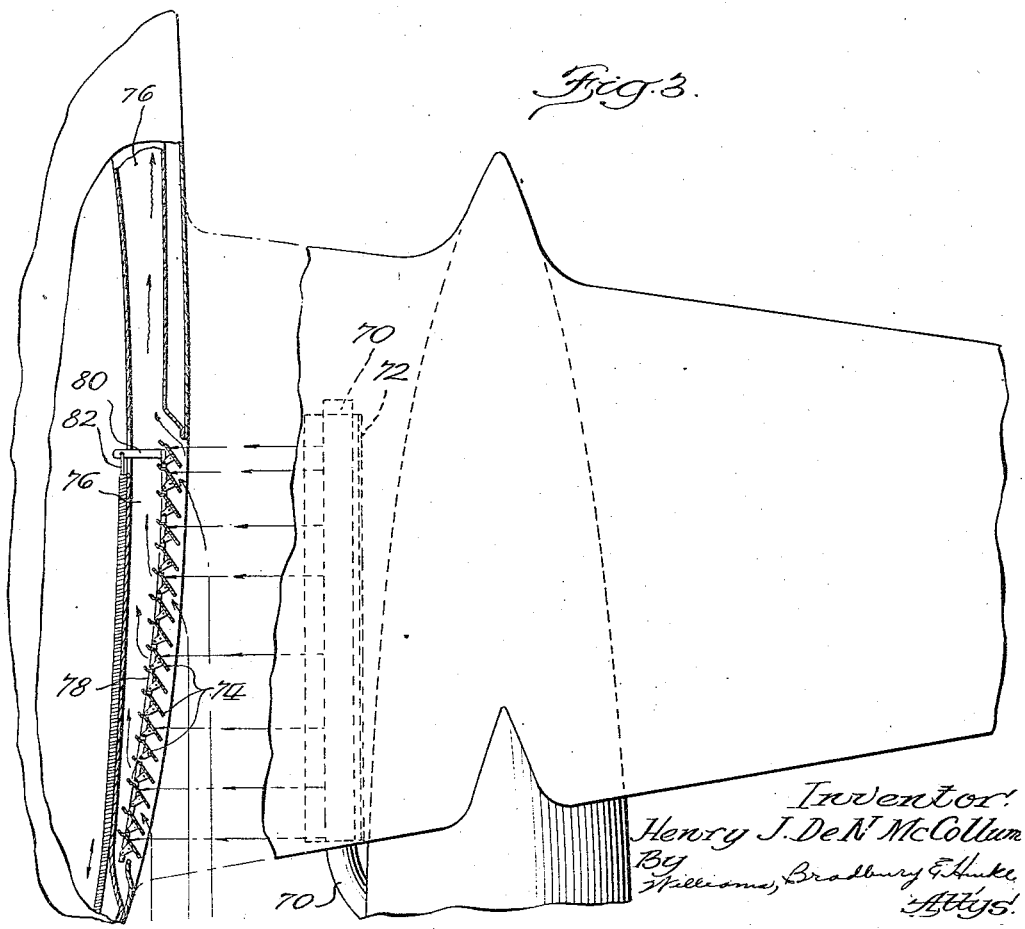
Inventor:
Henry J. De N. McCollum
By Williams, Bradbury & Huke
Attys.

Patented Oct. 8, 1946

2,408,867

UNITED STATES PATENT OFFICE 2,408,867

MEANS FOR UTILIZING RADIANT HEAT IN AIRCRAFT

Henry J. De N. McCollum, Chicago, Ill.; Thelma McCollum executrix of said Henry J. De N. McCollum, deceased Application July 22, 1942, Serial No. 451,876

4 Claims. (Cl. 244—134)

My invention pertains to method and means for utilizing radiant heat in aircraft and is more particularly concerned with, but not necessarily limited to, the utilization of radiant heat to raise the temperature of the passenger compartment and to prevent icing of the aircraft wings.

In both commercial and military aircraft operation there is constant danger that ice will form on the leading edge of the wings of the airplane and so interfere with the pilot's control of the plane that an accident will result. Many attempts have been made to prevent the formation of ice on the leading edges of the wings of airplanes or to remove the ice after it is once formed thereon. Typical examples of such attempts are the invertible pulsating rubber boots which are commonly used for this purpose. All of the equipment heretofore provided for this purpose has been objectionable from one or several standpoints, such as unduly increasing the weight of the plane, interfering with the aerodynamic properties of the wings, excessive cost, or lack of reliability and ruggedness under actual operating conditions.

One object of my invention is to provide a new and improved method for preventing the formation of ice on the leading edges of the wings of aircraft which will permit the use of lightweight, inexpensive, and serviceable equipment for accomplishing the desired result.

Another object of my invention is to provide new and improved apparatus which is light in weight, inexpensive, requires a minimum of service, and will effectively prevent the formation of ice on the leading edges of aircraft wings under actual operating conditions.

Another object of my invention is to provide method and means for preventing the formation of ice on the wings of aircraft which will utilize energy which is now wasted.

Another object of my invention is to provide method and means for preventing the formation of ice on aircraft wings which will not interfere with the aerodynamic design of the wings.

Another object of my invention is to provide new and improved means for utilizing energy which is now wasted in aircraft operation.

Another object of my invention is to provide novel method and means for utilizing radiant heat to heat selected parts of aircraft.

Another object of my invention is to provide new and improved method and means for utilizing energy normally lost in the aricraft engine exhaust to heat various parts of the airplane.

Another object of my invention is to provide new and improved radiant heating means.

Other objects and advantages will become apparent as the description proceeds.

In the drawings:

Fig. 1 is a diagrammatic representation of a front elevation of the upper portion of an airplane showing one embodiment of my invention applied thereto;

Fig. 2 is a horizontal section through an airplane wing showing a further embodiment of my invention applied thereto;

Fig. 3 is a top view of a portion of an airplane with parts cut away to show more clearly the application of a further embodiment of my invention; and Fig. 4 is a vertical section through the wing of an airplane showing a fourth embodiment of my invention.

In Fig. 1 I have illustrated somewhat diagrammatically an airplane of the type having two engines, only one of which is indicated by reference numeral 20. The engine may be located in the usual nacelle attached to the wing 22 and is illustrated as driving a four bladed propeller 24. It will be understood that the airplane may be of any desired type with any number of engines and with any suitable landing gear and other usual or desired equipment and that the particular airplane shown in Fig. 1 is selected for purposes of illustration only.

The engine 20 discharges its exhaust gases through an exhaust pipe 26 which, during normal operation, becomes a cherry red and gives off great quantities of heat which are now wasted. A feature of my invention lies in the utilization of this heat to maintain parts of the plane at predetermined temperatures.

In Fig. 1 I have illustrated an apparatus for utilizing the heat of the exhaust pipe 26 to maintain the cabin or other compartment of the airplane at any desired temperature. In this figure I have provided a parabolic reflector 28 which extends lengthwise of the exhaust pipe 26 for any length necessary to accomplish the desired purpose and partially surrounds this exhaust pipe, as clearly indicated in Fig. 1. The parabolic reflector 28 reflects and focuses the heat radiated by the exhaust pipe 26 and directs it toward the airplane cabin 30 in substantially straight lines, as shown in Fig. 1.

Section 32 of the cabin wall toward which this radiant heat is directed by the reflector 28 is made of a special glass which permits the passage of radiant heat therethrough. Such a glass is manufactured by the Corning Glass Works, of Corning, New York, and is commercially available. In lieu of this special glass, any other material which permits the passage therethrough of radiant heat could be used for this section of the cabin wall.

The radiant heat from the reflector 28 impinges upon the thin metal wall 34 of an air duct 36. The wall 34 is preferably colored black to increase its heat absorbing capacity and is provided with sheet metal fins 38 which project into the air passage provided by duct 36, whereby heat radiated from the exhaust pipe 26 is transmitted to the air passing through this duct.

It will be understood that the glass panel 32 and heat absorbing wall 34 are of approximately the same length and width as the reflector 28 and are preferably, but not necessarily, arranged approximately parallel thereto. The duct 36 may serve as a means for admitting atmospheric air to the airplane cabin or other compartment and a ram, blower, or other suitable means may be provided to cause air flow through this duct.

Instead of constituting a passageway for the admission of atmospheric air to the cabin or other compartment of the airplane, the duct 36 could be used merely for the circulation of air in the cabin and blower or any other suitable means could be used to circulate air from the cabin through this duct, thereby heating the circulated air and the interior of the cabin itself through the intermixing of the circulated air with the quiet air therein.

While I have found it preferable to direct the radiant heat against the wall of a duct or other air passage, such an arrangement is not essential and other arrangements may be used in lieu thereof. Under some circumstances the finned wall 34 could be used without the remainder of the duct and would serve the purpose of an ordinary heat radiator. When a wall like the wall 34 is used by itself, it would usually be more desirable to arrange the fins vertically to create a stack effect like that created by the usual room radiator. Other similar modifications can, of course, be made to accommodate special conditions.

It will be noted that the method and apparatus disclosed in Fig. 1 require a minimum of additional parts and that these additional parts may be simple, inexpensive and lightweight. Furthermore, the only additional part which, under any conditions, is outside of the enclosed parts of the plane is the reflector 28 and this reflector presents only a thin forward edge which offers a minimum of drag. Furthermore, in some designs of plane the exhaust pipe and reflector will be located in the engine nacelle and the reflector will offer no additional drag whatsoever. Where the reflector is located in an enclosure such as an engine nacelle, such enclosure will, of course, have a wall panel of said glass like the panel 32.

The particular heating arrangement shown in Fig. 2 utilizes only heat which is otherwise wasted and in no wise interferes with the operation of the engine 20 or other operating mechanism of the plane. Where desired, the other side of the cabin may be provided with a second duct 36 heated by radiant energy obtained from the exhaust pipe of the other engine, not shown, or the heat from the exhaust pipe of this other engine may be utilized exclusively for other purposes, such as those hereinafter explained in connection with other embodiments of my invention.

In Fig. 2 I have illustrated an embodiment of my invention wherein the heat radiated from the engine exhaust pipe is utilized to maintain the leading edge of the airplane wing at such a temperature that ice will not form thereon. In this figure an engine exhaust pipe 40 is indicated as passing horizontally through that portion of a wing 42 which is adjacent a cabin or engine nacelle. A parabolic reflector 44 is located adjacent the forward edge 46 of the wing 42 lengthwise of the exhaust pipe for a distance sufficient to receive from this exhaust pipe the necessary amount of heat. The reflector 44 partially surrounds the exhaust pipe 40 and is of parabolic cross section to direct the heat radiated by the exhaust pipe in a stream lengthwise of the wing 42 as indicated by the light, parallel lines extending lengthwise of this wing and representing the radiant energy given off by the reflector 44.

The radiant energy received by the reflector 44 from the exhaust pipe 40 is directed against a plurality of diagonally arranged baffles 48, 50, 52, 54, 56, 58 and 60. The baffle 48 is provided with openings 62, which permit most of the radiant energy from the reflector 44 to pass through this baffle, but the intervening solid portions 64 of the baffle 48 direct a predetermined portion of the radiant heat toward the leading edge 46 of the wing 42. The radiant heat thus deflected or redirected against the forward edge of the wing by the baffle 48 raises the temperature of that portion of the leading edge of the wing which is opposite the baffle 48 sufficiently to prevent the formation of ice on this portion of the leading edge of the wing.

Part of the radiant energy which passes through the baffle 48 impinges upon solid portions of the baffle 50 and is redirected thereby toward the portion of the leading edge of the wing which is opposite this baffle 50. Other portions of the radiant energy passing through the baffle 48 also pass through openings 66 in the baffle.

Baffles 52, 54, 56 and 58 also have openings to permit radiant energy to pass therethrough and solid portions to deflect part of the radiant energy toward portions of the leading edge of the wing which are opposite these baffles. The last baffle 60 is impervious and all radiant energy striking this baffle is directed against that portion of the leading edge of the wing which is opposite this baffle.

In Fig. 2 the baffles are generally illustrated as taking care of a section of wing located between adjacent struts or wing supports 68. These structural members 68 have open central portions through which the radiant energy from the reflector 44 may freely pass. The baffles 48, 50, 52, 54, 56, 58 and 60 and reflector 44 may be of extremely lightweight material so that the addition of these parts will not appreciably increase the weight of the plane. In some designs the baffles and reflector may constitute structural members, in which case they would be made of heavier material having plated reflecting surfaces and in such arrangement the increased weight resulting from the adoption of my invention would be still further reduced.

The baffles 48, 50, 52, 54, 56, 58 and 60 are illustrated in Fig. 2 as being flat plates and under these circumstances would deflect a stream of radiant heat against the leading edge of the wing as broad as the stream directed against these baffles by the reflector 44. In some instances it may be desirable to concentrate the radiant heat on a narrower portion of the leading edge of the wing and this can easily be done by providing baffles whose reflecting surfaces are concave. If, on the other hand, it should be desired to direct the radiant heat over a broader portion of the leading edge of the wing, the reflecting surfaces of the baffles could be made convex.

An important feature of that embodiment of my invention shown in Fig. 2 lies in the fact that any additional parts required are located within the wing itself and do not necessitate any change in the external shape of the wing. This permits the plane designer to give the leading edge of the wing any shape which he considers most desirable or effective and my invention in no wise limits his selection in this regard.

In Fig. 3 I have shown a further form of apparatus for heating the airplane cabin by radiant heat. In this embodiment of my invention the engine exhaust pipe 70 is provided with a parabolic reflector 72, which may be identical with the reflectors heretofore described. The reflector 72 directs radiant heat toward the pivoted metal shutters 74 which control the admission of atmospheric air to a duct 76 leading to the cabin or other compartment of the airplane. The shutters 74 are preferably colored black and absorb the radiant heat directed thereagainst by the reflector 72. The heated shutters 74 give up their heat to the air passing therebetween and thus heat the atmospheric air admitted to the duct 76.

The shutters 74 are connected to a control strip 78, having an arm 80 connected to and moved by a Bowden wire 82 which may be either manually or automatically controlled to shift the shutter 74 to admit more or less air to the duct 76.

In Fig. 4 I have shown a modification of the de-icing apparatus of Fig. 2. In Fig. 4 a radiant heater, diagrammatically indicated at 90, radiates heat to a reflector 92 which directs the radiant heat lengthwise of the wing 94. This wing is of tapering cross section and the reflector 92 is so designed that the stream of radiant heat converges as it travels lengthwise of the wing. The heat radiated by the reflector 92 passes through openings in the wing struts 96 and is deflected against the leading edge of the wing by baffles 98 which are illustrated as arranged in the same manner as shown in Fig. 2.

The radiant heater 90 may be of any suitable type and construction and may derive its heat from any available or suitable source of energy. For example, such heater may be an internal combustion heater burning gasoline or other suitable fuel, supplied from any available source, or may be an electric heater, supplied with current from a generator or battery.

It is to be understood that the particular embodiments disclosed herein are illustrative only and that numerous modifications and variations may be made without departing from my invention. Also while my invention is particularly adapted for use in connection with airplanes or other aircraft, it is not limited to such use and various features of my invention may be utilized in other applications. The scope of my invention is defined in the following claims.

I claim:

1. Apparatus for preventing the icing of airplane wings which comprises means for radiating heat energy as a beam lengthwise of each wing, and means for deflecting different portions of each beam against the leading edge of its wing.

2. Apparatus for preventing icing of the leading edge of an airplane wing comprising means for radiating heat energy lengthwise of said wing and a plurality of baffles located lengthwise of said wing and each serving to deflect a portion of said heat energy against a portion of the leading edge of said wing.

3. Means for heating a surface capable of absorbing radiant heat comprising means for radiating heat in a beam parallel to said surface, and means for deflecting increments of said radiated heat against successive lengthwise portions of said surface.

4. Apparatus for heating an airplane wing comprising an exhaust pipe extending transversely of said wing, a reflector for receiving heat energy radiated by said exhaust pipe and directing said radiant energy longitudinally of said wing, and a plurality of perforated baffles deflecting increments of said radiated heat against successive longitudinal portions of said wing.

HENRY J. DE N. McCOLLUM.